United States Patent [19]

Campbell

[11] Patent Number: 4,975,323

[45] Date of Patent: Dec. 4, 1990

[54] FERROPHOSPHORUS PARTICLES TREATED WITH HYPOPHOSPHOROUS ACID

[75] Inventor: Donald H. Campbell, Niagara-on-the-Lake, Canada

[73] Assignee: Occidental Chemical Corporation, Niagara Falls, N.Y.

[21] Appl. No.: 399,130

[22] Filed: Aug. 28, 1989

[51] Int. Cl.$^5$ .................... B32B 5/16; B05D 7/14; H01B 1/22
[52] U.S. Cl. .................... 428/328; 427/216; 427/221; 252/519; 428/403
[58] Field of Search .............. 427/216, 221; 252/500, 252/519; 428/403, 407, 328

[56] References Cited

U.S. PATENT DOCUMENTS

| | | | |
|---|---|---|---|
| 4,477,296 | 10/1984 | Nair | 148/6.14 R |
| 4,629,659 | 12/1986 | Kyono et al. | 204/44.7 |
| 4,728,462 | 3/1988 | Miller et al. | 252/513 |
| 4,746,412 | 5/1988 | Uchida et al. | 204/44.7 |
| 4,794,050 | 12/1988 | Campbell | 428/551 |
| 4,828,614 | 5/1989 | Miller et al. | 252/519 |

Primary Examiner—Norman Morgenstern
Assistant Examiner—Terry J. Owens
Attorney, Agent, or Firm—James F. Tao; Richard D. Fuerle

[57] ABSTRACT

The conductivity of ground ferrophosphorus particles is increased by contacting the particles with an aqueous solution of hypophosphorus acid, preferably at a temperature between room temperature and about 50°C. The particles are then washed and dried and can be mixed with resinous binders to formulate coating compositions. The coating compositions are particularly useful for coating galvanized steel that is to be welded.

11 Claims, No Drawings

FERROPHOSPHORUS PARTICLES TREATED WITH HYPOPHOSPHOROUS ACID

BACKGROUND OF THE INVENTION

This invention relates to a method of increasing the conductivity of ground ferrophosphorus particles. In particular, it relates to a process wherein ground ferrophosphorus particles are treated by immersion in a solution of hypophosphorous acid.

Due to concern about the corrosion of automobile bodies, the automotive industry has increasingly used galvanized steel for making auto body parts. While galvanized steel offers increased protection from corrosion, it is more difficult to form and weld than is uncoated steel. In spot welding galvanized steel, for example, the copper electrodes used in the welding can alloy with the zinc coating on the steel to form brass. The brass has a lower melting point, and is weaker than the steel, and bonds to the electrode. This results in portions of the electrode breaking off, which significantly reduces the life of the electrode.

The formation of brass at the tip of the electrode can be greatly reduced by coating the galvanized steel with a primer containing ferrophosphorus particles in a resinous binder. (see, for example, U.S. Pat. Nos. 4,794,050, 3,884,705 and 4,109,763). In order for the welding currents to effect the weld, it must pass through the ferrophosphorus coating. This means that there must be a sufficient number of conductive ferrophosphorus particles in the coating, and their points of contact must be conductive enough to initiate the weld.

Ferrophosphorus is a co-product in the production of phosphorus. To obtain the ferrophosphorus pigment particles used in these coatings, the ferrophosphorus is ground to the desired particle size. The degree to which the grinding operation reduces the particle size of the ferrophosphorus influences the efficacy of the ferrophosphorus-containing weldable primer. The optimum particle size is determined by the thickness of the primer applied and the desired function of the primer. For example, the particles must be smaller than the coating thickness or rough or dull surfaces will result, yet not so small that a large number of particle to particle contacts are required to achieve the conductivity essential for weldability. Each interface represents a point of minimum conductivity and too many such points can hurt weldability. The ferrophosphorus-containing weldable primer can serve several functions in addition to corrosion protection; simple weldability alone is obtained with low (about 15% by volume) loadings of the ferrophosphorus pigment while weldability at lower welding currents and with extended electrode life is achieved with higher loadings (about 45% by volume). Of course, the primer must be formulated to satisfy manufacturing, application and economic considerations. It is apparent that increased conductivity at the ferrophosphorus particle surface would enable a wider ranger of particle sizes and pigment loadings to be used, thus facilitating formulation and allowing the use of primers superior in performance or economics to those now available.

It has further been found that the conductivity of ground ferrophosphorus particles can be increased by treatment with an acid, such as hydrochloric, nitric, or sulfuric acid. Although not yet fully understood, it is likely that acidic treatment of ground ferrophosphorus dissolves oxides and/or phosphates on the particle surface formed during the grinding operation and/or removes surface contaminants introduced during processing. However, this increased conductivity is transitory and the resistance of the particles increases rapidly after a short period of time. An improved treatment of ferrophosphorus particles to increase conductivity is described in U.S. Pat. No. 4,728,462. In that patent, the particles are treated with an aqueous solution containing a dilute mineral acid and ions of chromium and a metal selected from the group consisting of zinc, strontium, calcium, barium, lead, or copper. While that treatment is effective in increasing the conductivity of the particles, the use of chromium in the treatment creates environmental problems in the manufacture of the primer and in the welding of the primed metal.

SUMMARY OF THE INVENTION

I have discovered that the conductivity of ground ferrophosphorus particles can be increased by a very substantial amount by treating the particles with hypophosphorous acid. In a simple bulk resistivity test described below, untreated ground ferrophosphorus particles have a resistivity of greater than about 200 ohms, ground ferrophosphorus particles treated according to this invention have a resistivity of only about 4.6 ohms, which means that the particles are more than 50 times as conductive. Moreover, this increased conductivity is not transitory. As a result, when formulating and using ferrophosphorus primers that contain ferrophosphorus particles treated according to this invention, it is not necessary to use as high a concentration of ferrophosphorus particles, or smaller particles can be used, or the coating can be thicker, or some combination thereof. This increased flexibility permits the formulation of better quality coatings and enables one to use the primer in applications where it otherwise could not be used.

DESCRIPTION OF THE INVENTION

Ferrophosphorus is an iron phosphide compound containing about 20 to about 28% by weight phosphorus and the remainder iron, and corresponds chemically to a mixture of $Fe_2P$ and $FeP$. Commercial ferrophosphorus typically contains up to about 5% by weight of impurities, principally silicon and manganese. A particularly suitable ferrophosphorus pigment is Ferrophos ® pigment, which is manufactured and sold by the Occidental Chemical Corporation.

Ferrophosphorus is produced as a by-product in the commercial manufacture of elements phosphorus by the electric furnace reduction of phosphate ores. The ferrophosphorus used in the process of this invention can be obtained by grinding larger pieces of ferrophosphorus formed in that or other processes. During or after the grinding process a surface contamination of unknown chemical composition is produced on the particles. While the invention is applicable to ferrophosphorus particles of any size, it is particularly useful in particles having a size of about 0.5 microns to about 50 microns; particles used in coatings on galvanized steel are typically about 2.5 to about 5.5 microns.

In the process of this invention, the ground ferrophosphorus particles are treated by contact with an aqueous solution of hypophosphorous acid ($H_3PO_2$). It has been found that other compounds that are closely related to hypophosphorous acid, such as sodium hypophosphite, are not nearly as effective as hypophosphorous acid in increasing the conductivity of ground ferrophosphorus particles. While hypophosphorous acid is available commercially as aqueous solutions of up to about 50 percent by weight, solutions of about 1 to about 20 percent are suitable for this invention. Depending on the concentration of the hypophosphorous acid, the particles are contacted with the solution of hypophosphorous acid for an interval of about 1 to about 10 minutes or more. While the particles can be sprayed with the solution, it is best to immerse the particles in the solution. The temperature of the solution is not critical, and temperatures from room temperature up to about 50° C. or more are operable. After the treatment, the particles can be separated from the acid solution by, for example, centrifuge or other means. The particles can then be washed with water and dried.

A coating composition, such as a primer or paint, containing the particles can be prepared by mixing the particles with a suitable organic or inorganic resinous binder according to formulations well known in the art. Typical resinous binders include various synthetic resins such as epoxies, chlorinated rubber, polystyrene, polyvinyl acetate resins, silicons, silanes, borates, silicates, acrylics, polyurethanes, and the like. The ferrophosphorus particles will typically comprise about 40% to about 90% by weight of the solids in the coating composition. In addition to the binder, the coating composition may also contain solvents, plasticizers, catalysts, and other components known to those skilled in the art of formulating coating compositions.

The coating composition can be applied to the substrate by any suitable technique including, for example, spraying, brushing, immersion, flowing, or the like. Once the coating has been applied to the substrate, it is hardened by any of a variety of processes including, for example, chemical reaction or polymerization within the coating, evaporation of solvents, and chemcial reaction with oxygen in the air. The resulting hardened coating may have almost any thickness, but a typical thickness is about 0.1 to about 10 mls. While the coating is most useful on galvanized steel that is to be welded, particularly spot welded, the coating composition is also useful when applied to other metals. Because of the high conductivity of the ferrophosphorus particles, they are also useful in zinc-rich paints where they improve the utilization of the zinc as a sacrificial material. The ferrophosphorus particles of this invention can also be used in conductive electromagnetic interference coatings, which are applied to non-conductive substrates to block the transmission of electromagnetic radiation, and in antistatic coatings, which are applied to non-conductive substrates to prevent the build-up of static electricity by conducting it to a ground.

The following examples further illustrate this invention:

EXAMPLE

To 240 mls. of deionized water was added 60 mls. of 50 percent by weight hypophosphorus acid. A second solution was prepared by adding 48 grams of sodium hypophosphite monohydrate to 300 mls. of deionized water. To 300 mls. of each solution was added 300 mg. of a ferrophosphorus pigment having an average particle size of about 3 microns (HRS2132 grade), or 5 microns (HRS2131 grade), sold by Occidental Chemical Corporation as Ferrophos ® pigment, and the resulting slurry was stirred by hand for 4 minutes, then placed in a centrifuge. After centrifuging, the pigment was washed with deionized water (about 50 mls.), then with 125 mls. of acetone. The particles were dried in air overnight.

The bulk conductivity of the particles was determined by a simple test in which a 1.37 cm inside diameter column filled with 5 grams of the pigment, was compressed by a Carver press to 20 percent of the tap volume. The following table give the results:

| Sample | Bulk Resistivity (ohms) | |
|---|---|---|
| | Initial | Stable |
| Untreated Control (HRS2132) | >200 | — |
| $H_3PO_2$ treated | 0.6 | 4.6 |
| $NaH_2PO_2$ Treated | >200 | — |
| Untreated Control (HRS2131) | 11 | — |
| Heated as in U.S. Pat. No. 4,728,462 | 0.3 | 4.1 |

The table shows that while the sodium hypophosphite treatment had a slight effect on the bulk resistivity, the hypophosphorous acid treatment was very effective and the resulting stable conductivity was more than 50 times that of the Control, and similar to that achieved using chromium as taught in U.S. Pat. No. 4,728,462.

I claim:

1. A method of treating ground ferrophosphorus particles comprising contacting said particles with an aqueous solution of hypophosphorous acid.

2. A method according to claim 1 wherein said hypophosphorous acid is a 1 to 20% solution at a temperature between room temperature and about 50° C., and said particles are immersed in said solution for about 1 to about 10 minutes.

3. A method according to claim 1 wherein said particles are ground to an average particle size of about 0.5 to about 50 microns.

4. A method according to claim 3 wherein said particles are ground to an average particle size of about 2.5 to about 5.5 microns.

5. A method according to claim 1 including the additional last steps of washing said particles with water, then drying them.

6. Ferrophosphorus particles prepared according to claim 1.

7. A coating composition comprising a resinous binder and ferrophosphorus particles according to claim 6.

8. A coating composition according to claim 7 wherein said ferrophosphorus particles comprise about 40 to about 90% of the weight of the solids in said composition.

9. A substrate coated with a coating composition according to claim 7.

10. A substrate according to claim 9 wherein said substrate is galvanized steel.

11. A method of increasing the conductivity of ground ferrophosphorus particles comprising immersing said particles in an aqueous solution of hypophosphorous acid at a temperature between about room temperature and about 50° C., washing said particles with water, and drying said particles.

* * * * *